(12) United States Patent
Chen

(10) Patent No.: US 10,160,514 B1
(45) Date of Patent: Dec. 25, 2018

(54) BICYCLE CRANKSET

(71) Applicant: DRIVETRAIN TECH SOLUTION INC., Taichung (TW)

(72) Inventor: Po-Cheng Chen, Taichung (TW)

(73) Assignee: Drivetrain Tech Solution Inc., Taichung (TW)

( * ) Notice: Subject to any disclaimer, the term of this patent is extended or adjusted under 35 U.S.C. 154(b) by 0 days.

(21) Appl. No.: 15/616,465

(22) Filed: Jun. 7, 2017

(51) Int. Cl.
| B62M 3/06 | (2006.01) |
| B62M 9/08 | (2006.01) |
| B62M 1/36 | (2013.01) |
| F16H 35/00 | (2006.01) |
| B62M 11/04 | (2006.01) |
| B62M 9/00 | (2006.01) |

(52) U.S. Cl.
CPC ............... *B62M 3/06* (2013.01); *B62M 1/36* (2013.01); *B62M 9/085* (2013.01); *B62M 11/04* (2013.01); *F16H 35/00* (2013.01); *B62M 2009/002* (2013.01); *F16H 2035/001* (2013.01); *F16H 2035/003* (2013.01)

(58) Field of Classification Search
CPC . B62M 1/00; B62M 1/24; B62M 1/26; B62M 1/28; B62M 1/36; B62M 1/38; B62M 9/00; B62M 9/02; B62M 9/16; B62M 9/085; B62M 2009/002; B62M 9/04; B62M 9/08; B62M 11/00; B62M 11/02; B62M 2700/00; B62M 2700/003; B62M 2700/006; B62M 2701/0076; B62M 3/06; B62M 11/04; B06B 1/163; A63B 2022/0611; F16H 2007/0844; F16H 2007/0893; F16H 7/10; F16H 7/14

USPC .......... 74/570.1, 571.1, 594.1, 594.2, 594.3, 74/594.4
See application file for complete search history.

(56) References Cited

U.S. PATENT DOCUMENTS

| 599,211 A | * | 2/1898 | Williams | ................. F16H 7/06 |
| | | | | 474/141 |
| 4,164,153 A | * | 8/1979 | Moritsch | ................. B62M 9/08 |
| | | | | 280/236 |
| 5,361,649 A | * | 11/1994 | Slocum, Jr. | ............. B62M 3/08 |
| | | | | 280/259 |

(Continued)

FOREIGN PATENT DOCUMENTS

| JP | 55010144 A | * | 1/1980 |
| JP | 56083650 A | * | 7/1981 |

(Continued)

*Primary Examiner* — Prasad V Gokhale
(74) *Attorney, Agent, or Firm* — Wang Law Firm, Inc.

(57) ABSTRACT

A bicycle crankset, which is adapted to connect to a chain, includes a chainring, a spider, and a crankarm. The chainring has teeth on an edge thereof to engage the chain and a chainring axis through a center thereof. The spider has spider arms to detachably connect to the chainring and a connecting bore. The spider has a core axis through a center of the connecting bore, and the core axis is kept a predetermined distance away from the chainring axis to form a deviation. The crankarm has an engaging member to engage the connecting bore of the spider. Tips of the teeth of the chainring move in a noncircular path when the crankarm is exerted to drive the chainring to turned, and the noncircular path is adjustable by shifting a location of the connecting bore which change the deviation.

5 Claims, 8 Drawing Sheets

(56) References Cited

U.S. PATENT DOCUMENTS

| | | | | |
|---|---|---|---|---|
| 5,516,132 | A | * | 5/1996 | Simkins .................. B62M 9/08 280/236 |
| 6,085,613 | A | * | 7/2000 | Niculescu ................ B62M 1/36 280/259 |
| 2007/0145709 | A1 | * | 6/2007 | Matsumoto ............ A63B 69/16 280/259 |
| 2010/0050810 | A1 | * | 3/2010 | Nakatani ................ B62M 9/105 74/594.2 |

FOREIGN PATENT DOCUMENTS

| | | |
|---|---|---|
| TW | M410712 U1 | 9/2011 |
| TW | I549862 B | 9/2016 |

* cited by examiner

1
BICYCLE CRANKSET

BACKGROUND OF THE INVENTION

1. Technical Field

The present invention relates to a bicycle, and more particularly to a bicycle crankset

2. Description of Related Art

Typically, a bicycle is provided with a round chainring, however more and more modern bicycles are provided with an elliptical chainring instead. The elliptical chainring has a directional parameter, which is an included angle between a major axis of the elliptical chainring and a plane of crankarms. The directional parameter determines the power of the bicycle. As a result, the manufactures may change the power of the bicycle by adjusting the directional parameter.

Taiwan patent no. I549862 disclosed an improvement of an ovoid bicycle chainring attachable to a crankarm, including drive-side crankarm with claws connected to an ovoid chainring. The claws have positioning portions. The ovoid chainring has several connecting portions to be connected to the positioning portions of the claws. A number of the connecting portions is a multiple of a number of the positioning portions to make the crankarm be connected to the ovoid chainring with different angle. In this patent, the crankarm may be adjusted for three degrees when the positioning portions are connected to the different connecting portions.

Taiwan utility model no. M410712 disclosed a crankset including a chain ring, a spider a crankarm, and a fixer. The chainring has a non-round outer edge and a round inner edge, and the inner edge is provided with teeth. The spider is provided with an annular connecting portion and teeth on the connecting portion. The teeth of the spider and the chainring are engaged to fix the spider to the chainring. The fixer secures the spider and the chainring to make the spider unable to move relative to the chainring. The spider may be engaged with the chainring with a specified angle, and then the fixer secures the spider and the chainring. As a result, the directional parameter as described above is adjustable by changing the angle of the spider.

BRIEF SUMMARY OF THE INVENTION

In view of the above, the primary objective of the present invention is to provide a bicycle crankset, which provides different torque outputs according to the change of the loading when cycling.

The secondary objective of the present invention is to provide a bicycle crankset, which provides an easy way to adjust the torque output of the crankset.

Yet another objective of the present invention is to provide a bicycle crankset, which may always keep make the crankset in a correct assembling.

In order to achieve the objective of the present invention, a bicycle crankset, which is adapted to connect to a chain, includes a chainring having a plurality of teeth on an edge thereof to engage the chain, wherein the chainring has a chainring axis through a center thereof; a spider having a plurality of spider arms to detachably connect to the chainring and a connecting bore, wherein the spider has a core axis through a center of the connecting bore; wherein the core axis is kept a predetermined distance away from the chainring axis to form a deviation; and a crankarm having an engaging member to engage the connecting bore of the spider. Tips of the teeth of the chainring move in a noncircular path when the crankarm is exerted to drive the chainring to turned, and the noncircular path is adjustable by shifting a location of the connecting bore which change the deviation.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
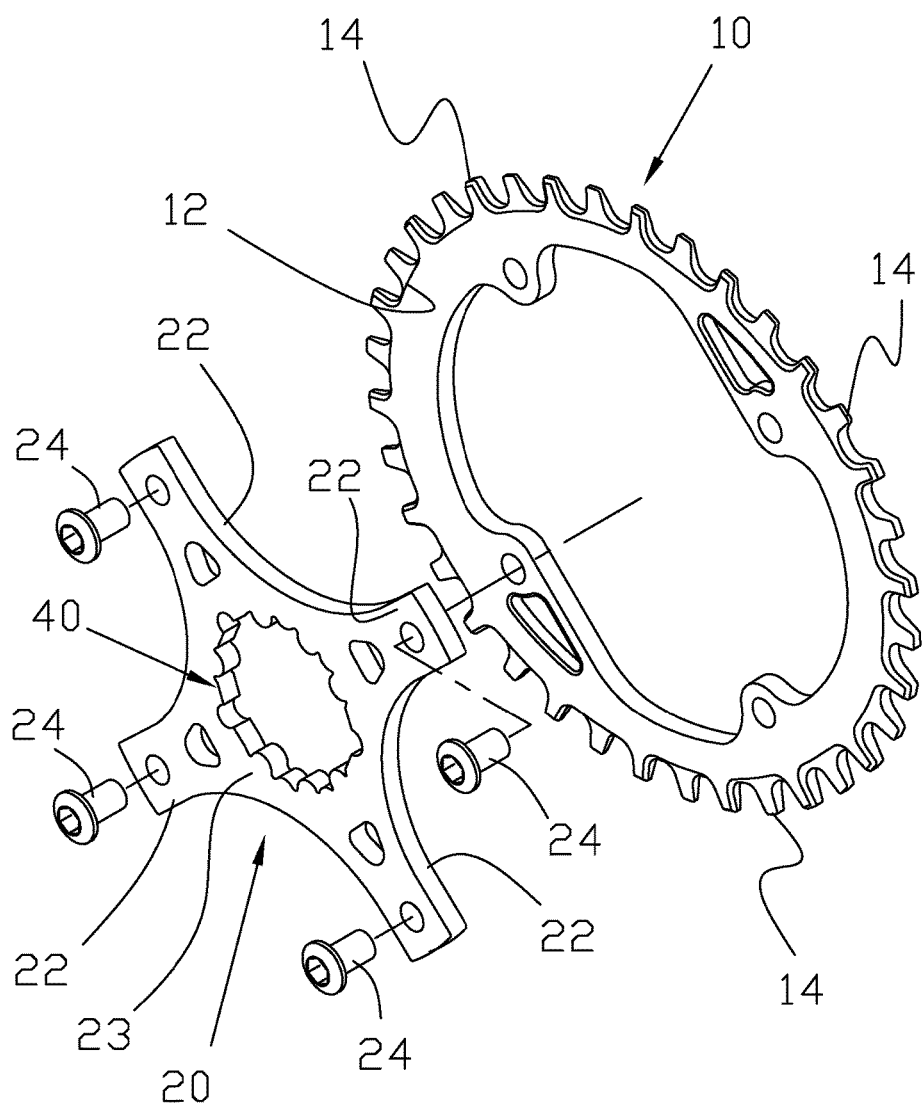
FIG. 1 is an exploded view of the chainring and the spider of a preferred embodiment of the present invention.
Figure 2:
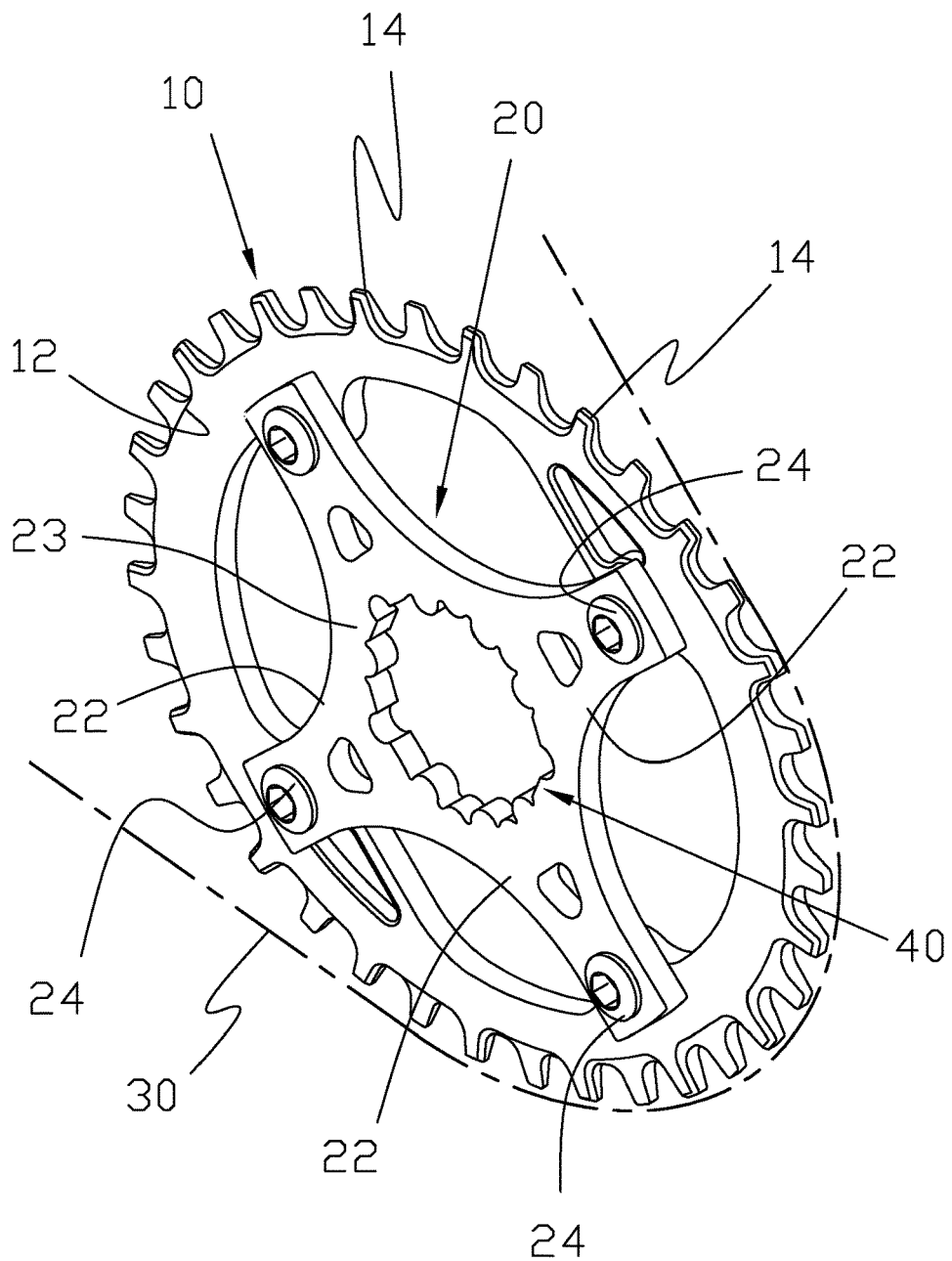
FIG. 2 is a perspective view of the chainring and the spider of the preferred embodiment of the present invention.

As shown in FIG. 1 and FIG. 2, a bicycle crankset of the preferred embodiment of the present invention includes a chainring 10 and a spider 20. The chainring 10 has an elliptical outer edge 12 and teeth 14 on the outer edge 12. Tips of the teeth 14 are in an elliptical circumference. The spider 20 has a plurality of spider arms 22 to be connected to the chain ring 10 by fasteners 24. The fasteners 24 could be screws and bolts, which are able to be fastened and released repeatedly. The spider 20 has a central portion 23, from which the spider arms 22 are projected, and a connecting bore 40 at a center of the central portion 23. A chain 30 engages the teeth 24 of the chainring 10 (FIG. 2).

Figure 3:
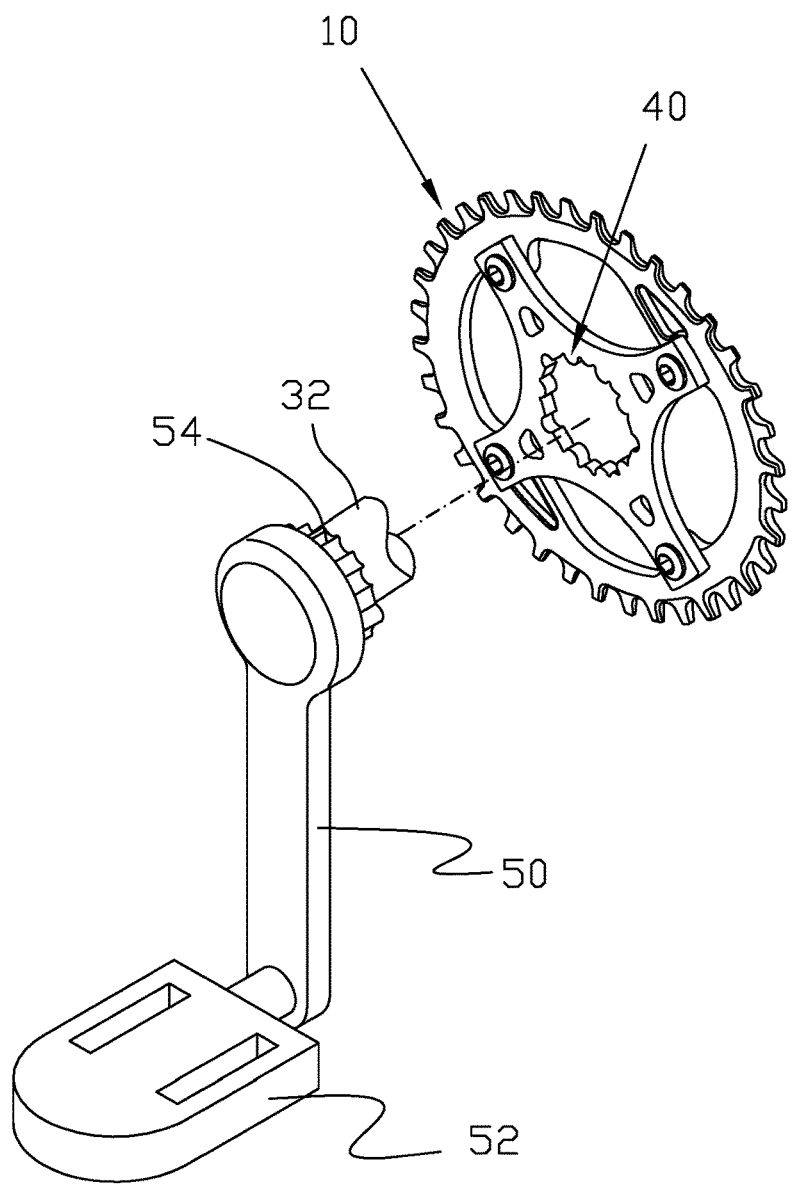
FIG. 3 is an exploded view of the preferred embodiment of the present invention.

As shown in FIG. 3, a crankarm 50 has a pedal 52 at an end thereof, and a connecting member 54 at an opposite end thereof. The connecting member 54 has a shape complementary to the connecting bore 40 to be inserted into the connecting bore 40. An axle 32 has an end connected to the connecting member 54 of the crankarm 50, and an opposite end connected to another crankarm (not shown). These two crankarms usually are mounted 180° apart.

Figure 4:
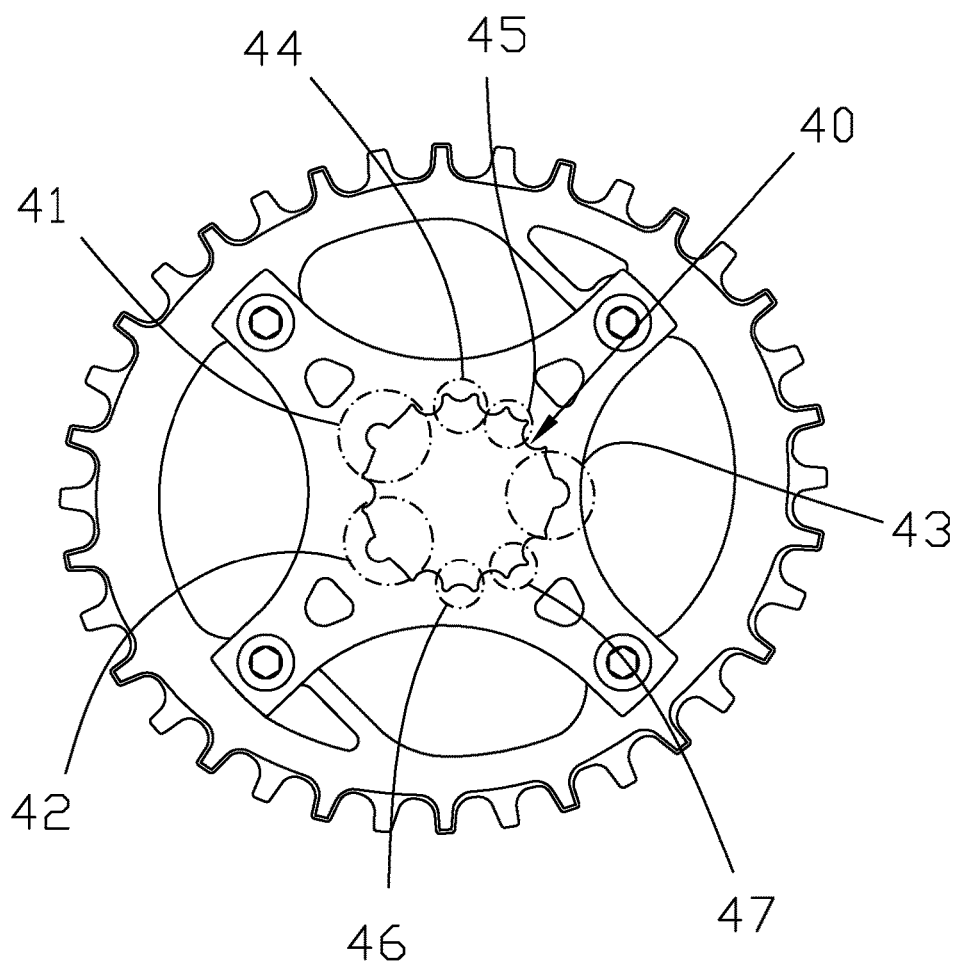
FIG. 4 is a front view of the chainring and the spider of the preferred embodiment of the present invention.
Figure 5:
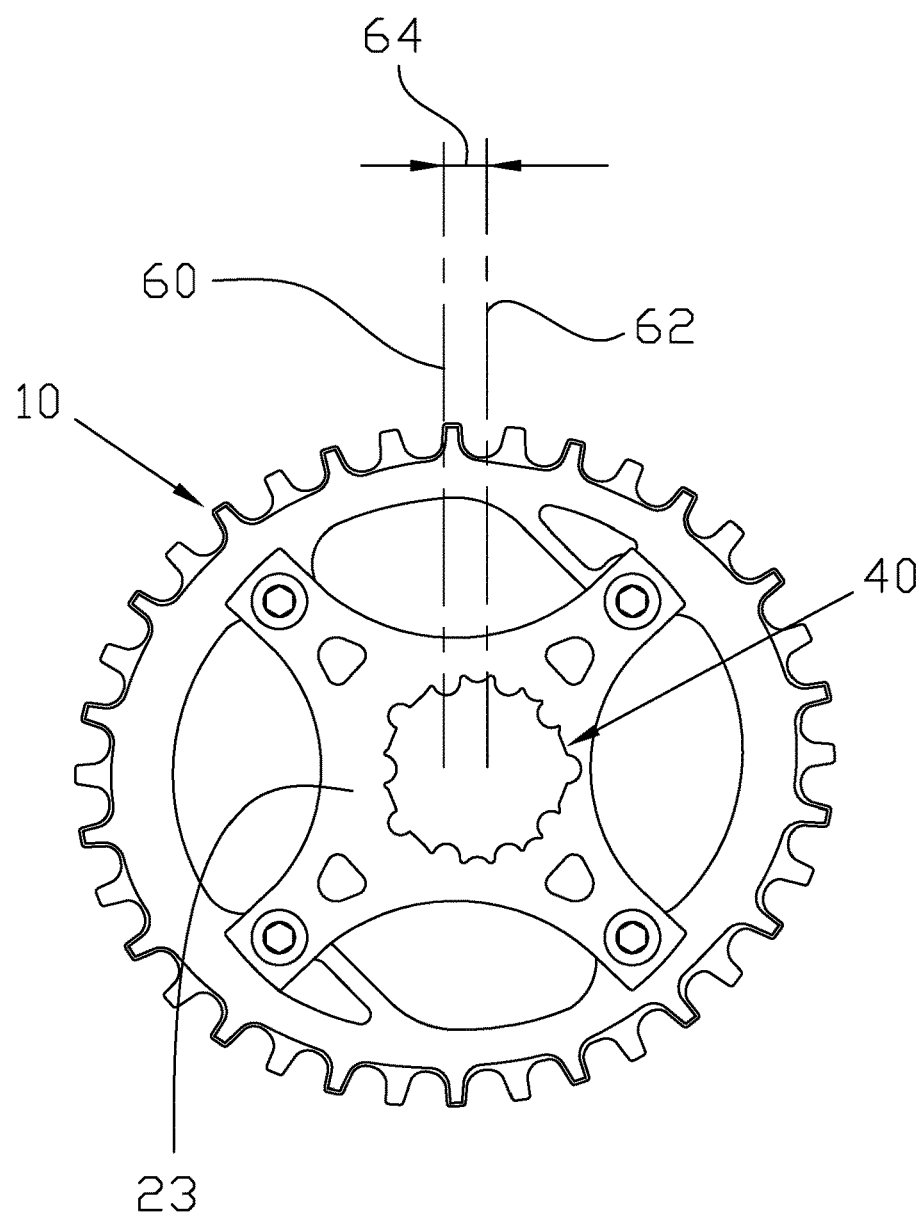
FIG. 5 is a front view of the chainring and the spider of the preferred embodiment of the present invention, showing the deviation.

As shown in FIG. 4, the connecting bore 40 has a plurality of protruding portions and recessing portions on an edge thereof, including a first protruding portion 41, a second protruding portion 42, a third protruding portion 43, a first recessing portion 44, a second recessing portion 45, a third recessing portion 46, and a fourth recessing portion 47. The first protruding portion 41 is next to the second protruding portion 42, the first recessing portion 44 is next to the second recessing portion 45, and the third recessing portion 46 is next to the fourth recessing portion 47. The first protruding portion 41 is next to first recessing portion 44, the second protruding portion 42 is next to third recessing portion 46, and third protruding portion 43 is between the second recessing portion 45 and fourth recessing portion 47. The connecting bore 40 is unsymmetrical.

The chainring 10 has a chainring axis 60 through a center thereof, and connecting bore 40 has a bore axis 62 through center thereof. The axes 60 and 62 are kept a deviation 64. The first way to form the deviation 64 is that a center of the spider 20 is on the chainring axis 60 of the chainring 10, and the connecting bore 40 is not on the center of the spider 20. That is, the connecting bore 40 is eccentric relative to the spider 40.

The second way (not shown) to form the deviation 64 is that the bore axis 62 of the connecting bore 40 is not on a center of the spider 20, and the center of the spider 20 is not on the chainring axis 60 of the chainring 10, or the bore axis 62 of the connecting bore 40 is on a center of the spider 20, and the center of the spider 20 is not on the chainring axis 60 of the chainring 10.

Figure 6:
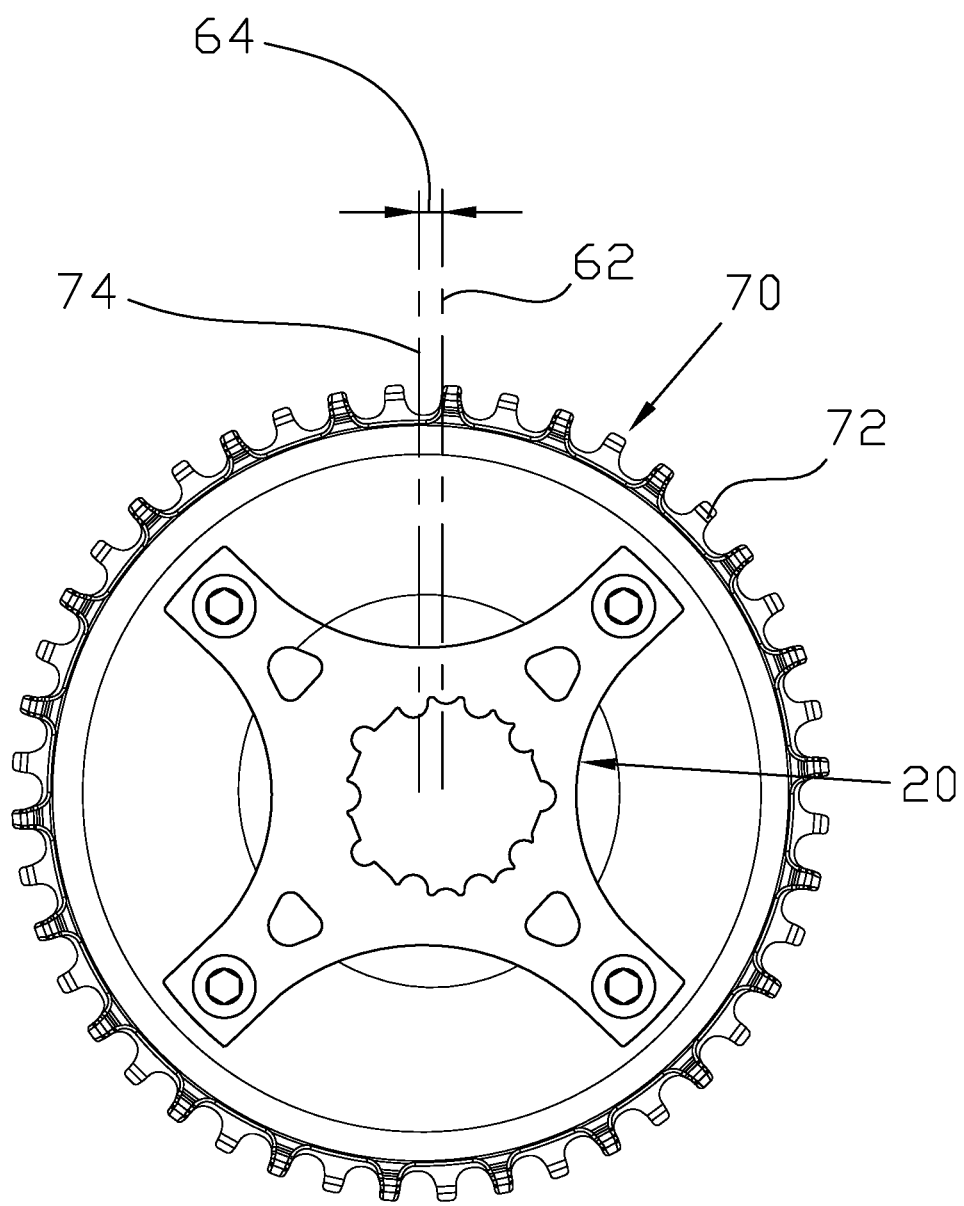
FIG. 6 is a front view of the round chainring and the spider of the preferred embodiment of the present invention, showing the deviation.

As shown in FIG. 6, a chainring 70 is provided with a plurality of teeth 72, and tips of the teeth 72 are in a round circumference. In other words, the chainring 70 is round. A chainring axis 74 runs through a center of the chainring 70. The spider 20 is connected to the chainring 70. The deviation 64 is a distance between the bore axis 62 and the chainring axis 74. The deviation 64 mat be formed by the first and the second way as described above, but not limited.

According to the description above, no matter the chainring 70 is round or elliptical, there always is a deviation 64 between the bore axis 62 and the chainring axis 74, so that the crankarm 50 is able to drive the spider 20 and the chainring 10 or 70 to turn, and the tips of the teeth of the chainring 10 or 70 move in a noncircular path, and the path is adjustable by changing the deviation 64. In an embodiment, the path is adjusted by replacing a different spider (not shown), on which a location of the connecting bore is different.

Figure 7:
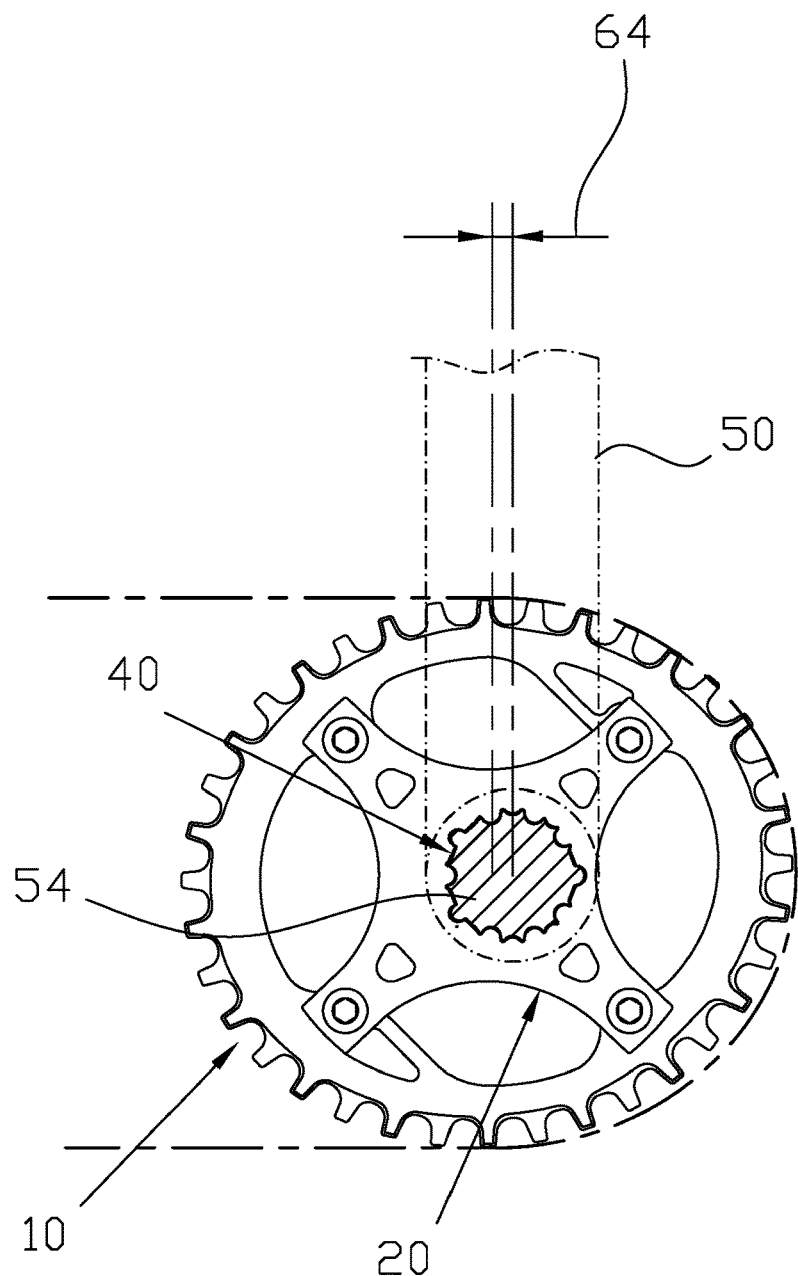
FIG. 7 is a perspective view of the preferred embodiment of the present invention.

As shown in FIG. 7, the connecting bore 40 is unsymmetrical, and complementary to the connecting member 54, so that there is only one angle that the connecting member 54 may be inserted into the connecting bore 40 to may sure the deviation 64 is the predetermined one.

The deviation 64 makes tips of the teeth of the chainring 10 turn in a noncircular path, no matter the chainring 10 is round or elliptical.

In conclusion, the power output may be adjusted by replacing a new spider 20 to have a different deviation 64.

Figure 8:
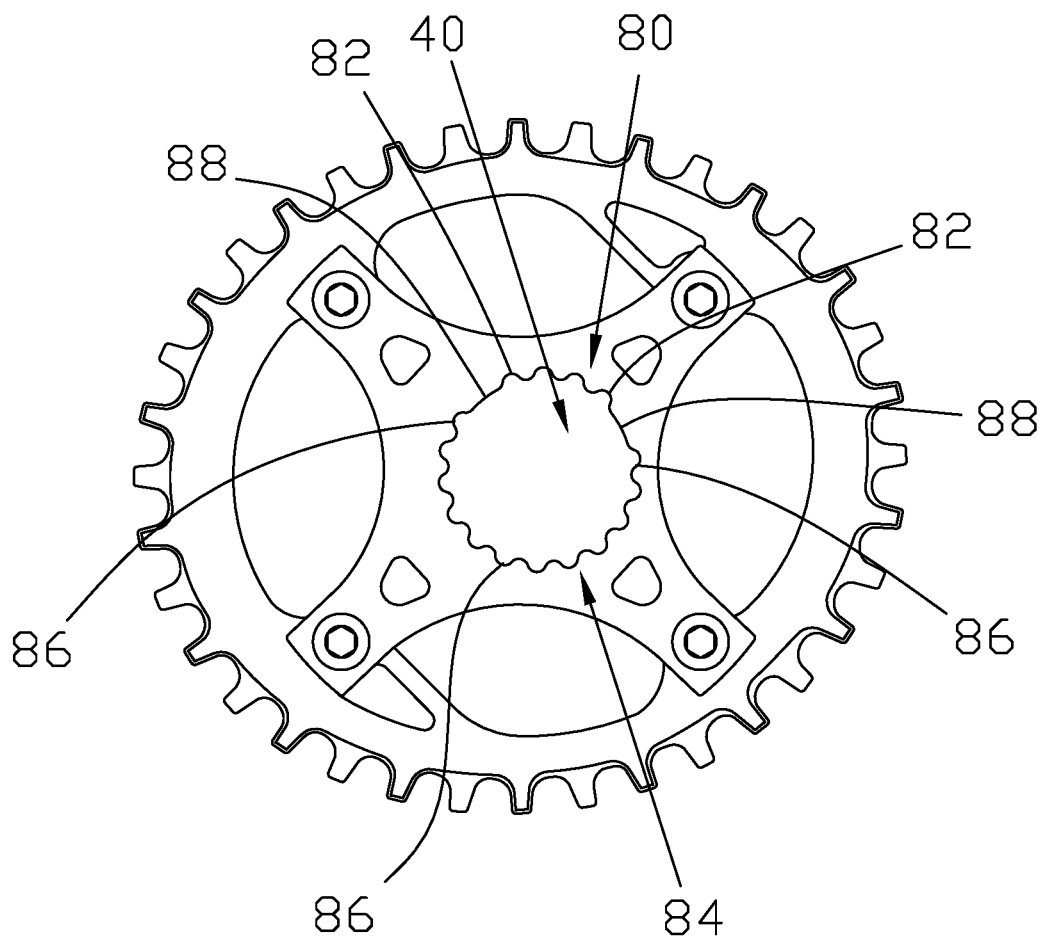
FIG. 8 is a front view of the chainring and the spider of the preferred embodiment of the present invention, showing an alternate connecting bore.

As shown in FIG. 8, it shows an alternate connecting bore 40. The connecting bore 40 has a first engaging portion 80, a second engaging portion 84, and two resting portions 88 on an edge thereof. The first engaging portion 80 has a plurality of first recesses 82, and the second engaging portion 84 has a plurality of second recesses 86. The resting portions 88 are between the first engaging portion 80 and the second engaging portion 84 respectively. A number of the first recesses 82 is not equal to a number of the second recesses 86 in the present preferred embodiment, and however, they may be equal in another embodiment. The resting portions 88 each has a straight edge in the present preferred embodiment, and they may have a curved edge in another embodiment. The first engaging portion 80, the second engaging portion 84, and the resting portions 88 make the crankarm (not shown) engage the spider in only one angle.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle crankset, which is adapted to connect to a chain, comprising:
   a chainring having a plurality of teeth on an edge thereof to engage the chain, wherein the chainring has a chainring axis through a center thereof;
   a spider having a plurality of spider arms to detachably connect to the chainring and a connecting bore, wherein the spider has a bore axis through a center of the connecting bore;
   wherein the bore axis is kept a predetermined distance away from the chainring axis to form a deviation; and
   a crankarm having a connecting member to engage the connecting bore of the spider;
   whereby tips of the teeth of the chainring move in a noncircular path when the crankarm is exerted to drive the chainring to turn;
   wherein the spider is fixedly connected to the chainring, and the connecting bore is kept at a fixed position relative to the chainring when the crankarm is turned.

2. The bicycle crankset of claim 1, wherein the tips of the teeth of the chainring are in a round circumference.

3. The bicycle crankset of claim 2, wherein the tips of the teeth of the chainring are in an elliptical circumference.

4. The bicycle crankset of claim 1, wherein the connecting bore has a first protruding portion, a second protruding portion, a third protruding portion, a first recessing portion, a second recessing portion, a third recessing portion, and a fourth recessing portion on an edge thereof; the first protruding portion is next to the second protruding portion, the first recessing portion is next to the second recessing portion, and the third recessing portion is next to the fourth recessing portion; the first protruding portion is next to first recessing portion, the second protruding portion is next to third recessing portion, and third protruding portion is between the second recessing portion and fourth recessing portion; further wherein the protruding portion is different from at least one of the second protruding portion, the third protruding portion, the first recessing portion, the second recessing portion, the third recessing portion, and the fourth recessing portion, so the connecting bore is unsymmetrical, and the connecting member of the crankarm is complementary to the connecting bore, whereby the connecting member is able to engage the connecting bore in a specified angle relative to the spider only.

5. The bicycle crankset of claim 1, wherein the connecting bore has a first engaging portion, a second engaging portion, and two resting portions on an edge thereof; the first engaging portion has a plurality of first recesses, and the second engaging portion has a plurality of second recesses; the resting portions are between the first engaging portion and the second engaging portion respectively; further wherein the first engaging portion is different from at least one of the second engaging portion and the resting portions, so the connecting bore is unsymmetrical, and the connecting member of the crankarm is complementary to the connecting bore, whereby the connecting member is able to engage the connecting bore in a specified angle relative to the spider only.

\* \* \* \* \*